(12) United States Patent
Coffin et al.

(10) Patent No.: US 6,618,348 B1
(45) Date of Patent: Sep. 9, 2003

(54) REAR-FACING AUTOCHANGER BAR CODE READER

(75) Inventors: Paul C. Coffin, Fort Collins, CO (US); Richard Gardner, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/729,870

(22) Filed: Dec. 5, 2000

(51) Int. Cl.[7] .............................................. G11B 15/68
(52) U.S. Cl. ....................................................... 369/178
(58) Field of Search ......................... 369/178, 178.01, 369/36, 38, 48, 191, 192, 193, 194, 30.45; 360/98.06, 92

(56) References Cited

U.S. PATENT DOCUMENTS

| | | | | |
|---|---|---|---|---|
| 4,932,826 A | * | 6/1990 | Moy et al. ..................... | 360/92 |
| 5,034,904 A | | 7/1991 | Moy ..................... | 364/571.04 |
| 5,059,772 A | * | 10/1991 | Younglove ................... | 360/92 |
| 5,237,468 A | * | 8/1993 | Ellis ............................. | 360/92 |
| 5,303,214 A | * | 4/1994 | Kulakowski et al. ....... | 369/174 |
| 5,581,522 A | * | 12/1996 | Sibuya et al. ................. | 360/92 |
| 6,025,972 A | | 2/2000 | Schmidtke et al. ...... | 360/98.06 |
| 6,104,693 A | | 8/2000 | Coffin et al. ................. | 369/178 |
| 6,155,766 A | * | 12/2000 | Ostwald et al. .............. | 360/92 |
| 6,205,093 B1 | * | 3/2001 | Abbott et al. ............ | 369/30.31 |
| 6,327,113 B1 | * | 12/2001 | Mueller et al. ............... | 360/92 |

FOREIGN PATENT DOCUMENTS

EP          0982724 A2     1/2000    ........... G11B/17/22

* cited by examiner

*Primary Examiner*—George J. Letscher
*Assistant Examiner*—Christopher R Beacham (57) ABSTRACT

A data storage system comprises a plurality of cartridge receiving devices provided within the data storage system. A cartridge engaging apparatus having a cartridge access side and a back side is mounted within the data storage system so that the cartridge engaging apparatus moves along a displacement path. The arrangement of the plurality of cartridge receiving devices and the displacement path is such that at least one of the plurality of cartridge receiving devices is located opposite the back side of the cartridge engaging apparatus. An information reader mounted to the cartridge engaging apparatus reads cartridge information provided on a data cartridge located adjacent the back side of the cartridge engaging apparatus.

20 Claims, 4 Drawing Sheets

REAR-FACING AUTOCHANGER BAR CODE READER

FIELD OF THE INVENTION

This invention relates generally to data storage systems for handling and storing data cartridges, such as optical disk or magnetic tape cartridges, and more specifically to systems for identifying the various data cartridges stored therein.

BACKGROUND

Many different types of data storage systems exist and are being used to store data cartridges at known locations and to retrieve desired data cartridges so that data may be written to or read from the data cartridges. Such data storage systems are often referred to as autochanger data storage systems, or simply, autochangers.

A typical autochanger data storage system may include one or more different types of cartridge receiving devices for holding the various data cartridges. For example, one type of cartridge receiving device may comprise an individual cartridge storage location or slot (for holding a single data cartridge) or a cartridge storage rack or "magazine" (for holding two or more data cartridges). Another type of cartridge receiving device may comprise a cartridge read/write device for reading data from or writing data to the data cartridge. The cartridge storage slots or magazines serve to provide storage locations for the data cartridges and are commonly arranged so that they form one or more vertical stacks, although other configurations are possible. The cartridge read/write device may be located at any convenient location within the data storage system.

The autochanger or data storage system may also be provided with a cartridge handling system for transporting the data cartridges between the various cartridge receiving devices, e.g., between the cartridge storage locations and the cartridge read/write devices. A typical cartridge handling system may include a cartridge engaging assembly or "picker" for engaging the various data cartridges contained in the cartridge receiving devices, as well as a positioning device for moving the cartridge engaging assembly among the various cartridge receiving devices.

Autochangers or data storage systems of the type described above are usually connected to a host computer system (not shown) which may access or store data on the data cartridges. For example, if the host computer system issues a request for data contained on a particular data cartridge, a control system associated with the autochanger actuates the positioning system to move the cartridge engaging assembly or "picker" along the cartridge storage locations until the cartridge engaging assembly is positioned adjacent the desired data cartridge. The cartridge engaging assembly may then remove the data cartridge from the cartridge storage location and carry it to the cartridge read/write device. Once properly positioned adjacent the cartridge read/write device, the cartridge engaging assembly may insert the selected data cartridge into the cartridge read/write device so that the host computer may thereafter read data from or write data to the data cartridge. After the read/write operation is complete, the cartridge engaging assembly may remove the data cartridge from the cartridge read/write device and return it to the appropriate cartridge storage location.

Since most such data storage systems contain a large number of individual data cartridges, some means is usually provided to allow the data storage system to identify and locate the desired data cartridge. Simpler data storage systems require the system operator to manually inventory the data cartridges. In such a manual operation, the system operator usually first identifies each cartridge, then programs the data storage system with the identity and storage location of each of the individual data cartridges. More sophisticated systems are capable of automatically performing the inventory operation. For example, a common type of automated inventory system provides each of the data cartridges with a machine-readable code (e.g., a bar code label) that uniquely identifies each data cartridge. The data storage system is then provided with a suitable code reader system (e.g., a bar code reader) to read or identify the code for each cartridge. Thus, when the data storage system is first placed in operation, the reader system will examine each data cartridge to ascertain its identity, then instruct the data storage system as to its location. This procedure is repeated for each individual cartridge. Once the data cartridges have been identified and inventoried, the data storage system will be placed in service.

It is often necessary or desirable for a system operator to periodically access one or more of the data cartridges contained within such a data storage system. For example, it may be necessary for the system operator to remove certain of the data cartridges from time to time if they become filled with data that is to be archived at another location. The system operator may then replace the filled data cartridges with blank data cartridges. In another situation, the system operator may desire to remove one or more of the data cartridges and replace it or them with a substitute data cartridge or cartridges containing different data.

Regardless of the reason for adding, removing, or replacing one or more of the data cartridges, the data storage system will need to re-inventory the data cartridges before it can be returned to operation. While the need to re-inventory the data cartridges may not be particularly burdensome in some cases, it can be particularly disadvantageous if the data cartridges are exchanged frequently or if the data storage system contains a large number of data cartridges.

SUMMARY OF THE INVENTION

A data storage system according to one embodiment of the present invention comprises a plurality of cartridge receiving devices provided within the data storage system. A cartridge engaging apparatus having a cartridge access side and a back side is mounted within the data storage system so that the cartridge engaging apparatus moves along a displacement path. The arrangement of the plurality of cartridge receiving devices and the displacement path is such that at least one of the plurality of cartridge receiving devices is located opposite the back side of the cartridge engaging apparatus. An information reader mounted to the cartridge engaging apparatus reads cartridge information provided on a data cartridge located adjacent the back side of the cartridge engaging apparatus.

Also disclosed is a method for detecting cartridge information provided on a data cartridge stored within a data storage system that comprises the steps of: Providing the data storage system with a cartridge engaging apparatus that moves along a displacement path so that at least one data cartridge is located opposite the back side of the cartridge engaging apparatus; providing an information reader to the cartridge engaging apparatus so that the information reader can read cartridge information provided on a data cartridge located adjacent the back side of the cartridge engaging apparatus; moving the cartridge engaging apparatus so that the back side is adjacent a data cartridge; and operating the information reader to read the cartridge information provided on the data cartridge.

BRIEF DESCRIPTION OF THE DRAWING

Illustrative and presently preferred embodiments of the invention are shown in the accompanying drawing in which.

DETAILED DESCRIPTION OF THE INVENTION

Figure 4:
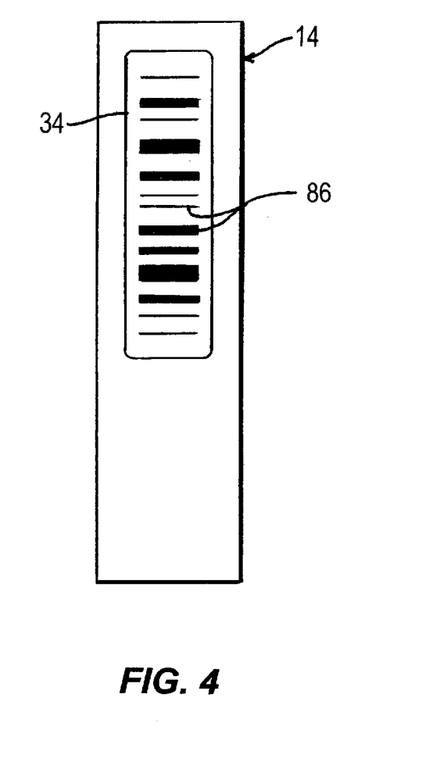
FIG. 4 is a side view in elevation of a data cartridge having a bar code label affixed thereto.

A rear-facing bar code reader or information reader 10 according to one preferred embodiment of the present invention is shown and described herein as it could be used in conjunction with a data storage or "autochanger" system 12 of the type known in the art for accessing data stored on a plurality of data cartridges 14. The auto changer system 12 is provided with a cartridge handling system 13 that includes a cartridge engaging assembly 36. The cartridge engaging assembly 36 is moveably mounted to the cartridge handing system 12 so that the cartridge engaging assembly 36 is moveable along a generally U-shaped displacement path 40. The cartridge engaging assembly 36 is capable of accessing and transferring the data cartridges 14 between one or more different types of cartridge receiving devices, such as one or more cartridge storage magazines 16 and one or more cartridge read/write devices 18, that are arranged around the U-shaped displacement path 40. The rear-facing bar code reader or information reader 10 is mounted to the cartridge engaging assembly 36 so that the bar code reader 10 is capable of reading a bar code label 34 (FIG. 4) positioned on a the data cartridge 14 that is located opposite the back side 42 of the cartridge engaging assembly 36.

Figure 1:
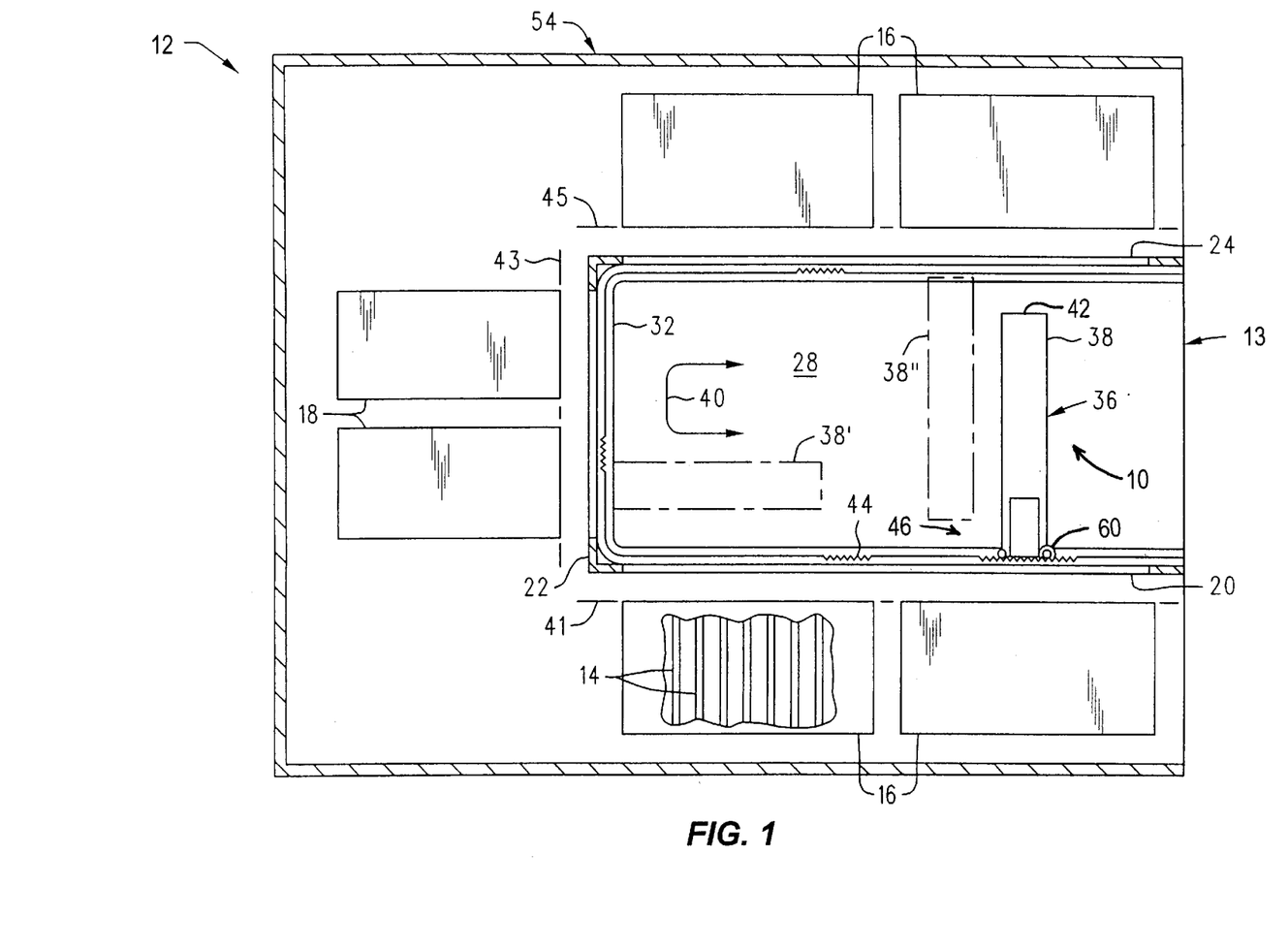
FIG. 1 is a plan view of a data storage system that includes the rear-facing bar code reader according to the present invention.
Figure 2:
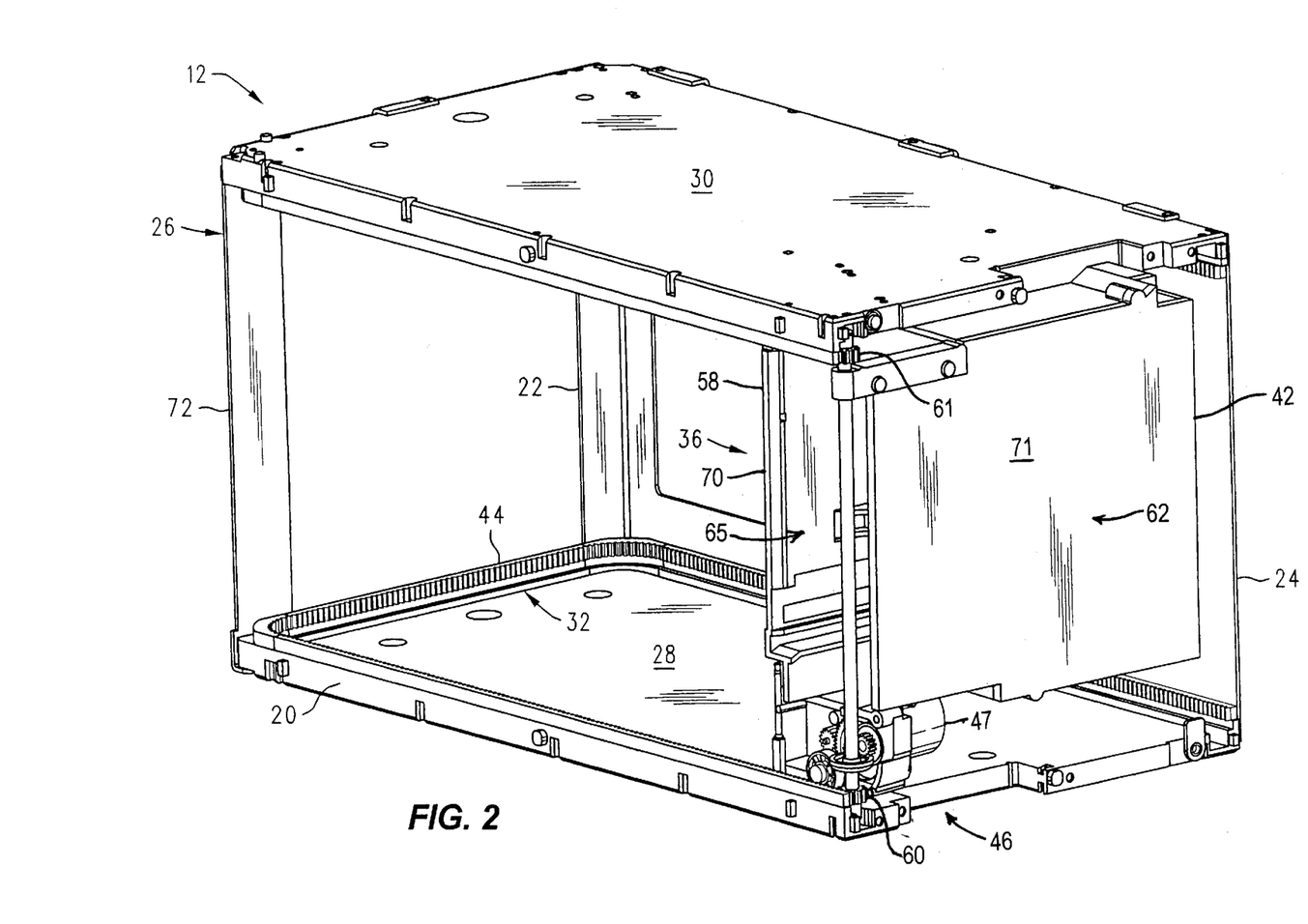
FIG. 2 is a perspective view of the cartridge handing system that may be used in the data storage system shown in FIG. 1.

With reference now primarily to FIGS. 1 and 2, the data storage system 12 may comprise a generally rectangularly shaped housing 54 that is sized to receive the various components comprising the data storage system 12. For example, in the embodiment shown and described herein, the housing 54 is sized to receive the various cartridge receiving devices (e.g., the cartridge storage magazines 16 and the cartridge read/write devices 18), as well as the cartridge handing system 13 that is capable of accessing and transferring the various data cartridges 14 between the various cartridge receiving devices (e.g., the cartridge storage magazines 16 and/or the cartridge read/write devices 18). The housing 54 may also contain various other components and systems (not shown), such as a control system, a power supply, a data buffer and transfer system, etc., that may be required or desired for the operation of the data storage system 12.

The cartridge handling system 13 is best seen in FIG. 2 and may comprise a generally rectangularly shaped frame assembly 26 having a lower or base plate 28 and an upper or top plate 30. The lower and upper plates 28 and 30 are held in generally parallel, spaced-apart relation by a support structure 72. The configuration is such that the frame assembly 26 of the cartridge handling system 13 defines a first cartridge access side 20, a second cartridge access side 22, and a third cartridge access side 24. See also FIG. 1. The first and third cartridge access sides 20 and 24 are positioned in generally spaced apart relation on opposite sides of the cartridge handling system 13, whereas the second cartridge access side 22 is oriented generally transversely to the first and third cartridge access sides 20 and 24. The various cartridge receiving devices 16 and 18 are positioned around the cartridge handling system 13 so that respective cartridge access planes 41, 43, and 45 defined by the cartridge receiving devices 16 and 18 are located adjacent the three cartridge access sides 20, 22, and 24. see FIG. 1.

The lower plate 28 of frame assembly 26 may be provided with a lower U-shaped guide member or track 32 that forms a substantially continuous member along the first, second, and third cartridge access sides 20, 22, and 24 of the frame assembly 26. Similarly, the upper plate 30 may be provided with an upper U-shaped guide member or channel (not shown) that also forms a substantially continuous member along the first, second, and third cartridge access sides 20, 22, and 24 of the frame assembly 26.

The cartridge engaging apparatus 36 is capable of loading and retrieving the data cartridges 14 from the cartridge receiving devices (e.g., the cartridge storage magazines 16 and the cartridge read/write devices 18) and engages the upper and lower U-shaped guide members or tracks (e.g., track 32). The U-shaped guide members or tracks guide the cartridge engaging apparatus 36 along the first, second, and third cartridge access sides 20, 22, and 24. That is, the cartridge engaging apparatus 36 may be moved between a first position 38, a second position 38', and a third position 38", i.e., along the generally U-shaped displacement path 40.

As is best seen in FIG. 1, the U-shaped arrangement of the cartridge receiving devices is such that the back side 42 of the cartridge engaging assembly 36 is opposite the cartridges 14 contained in the cartridge storage magazines 16 on the opposite side of the cartridge handling system 13. For example, when the cartridge engaging assembly 36 is traveling along the first cartridge access side 20 (e.g., including position 38), the back side 42 of the cartridge engaging assembly 36 will be opposite the cartridges 14 contained in the cartridge storage magazines 16 positioned adjacent the third cartridge access side 24. Conversely, when the cartridge engaging assembly 36 is traveling along the third cartridge access side 24 (e.g., including position 38"), the back side 42 of the cartridge engaging assembly 36 will be opposite the cartridges 14 contained in the cartridge storage magazines 16 positioned adjacent the first cartridge access side 20.

Figure 3:
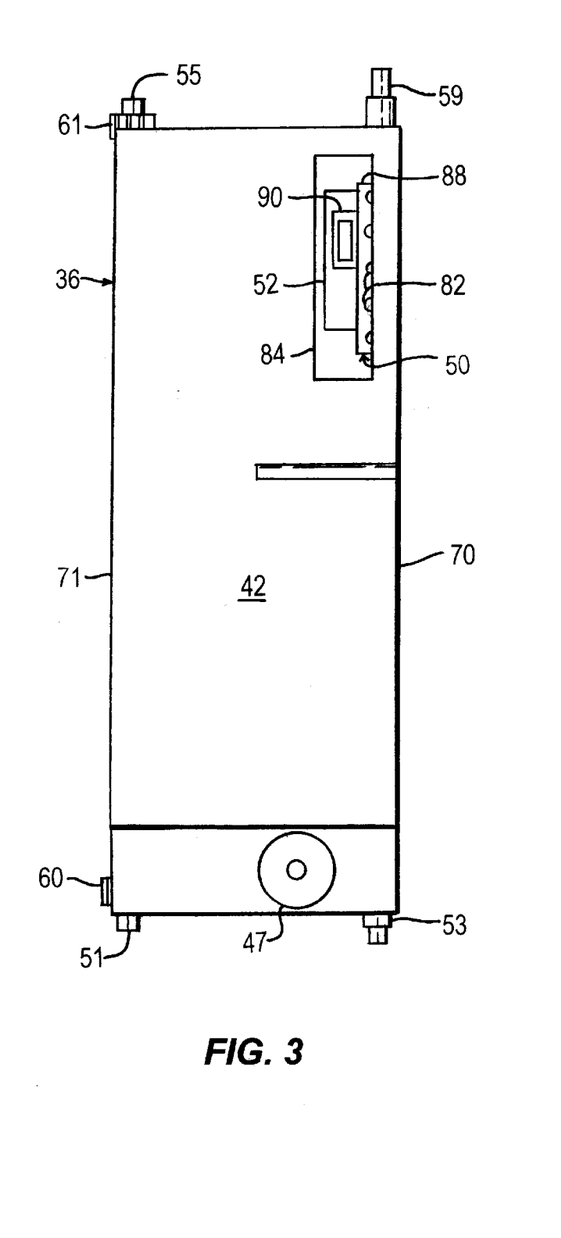
FIG. 3 is a side view in elevation of the back side of a cartridge engaging apparatus showing the rear-facing bar code reader.
Figure 5:
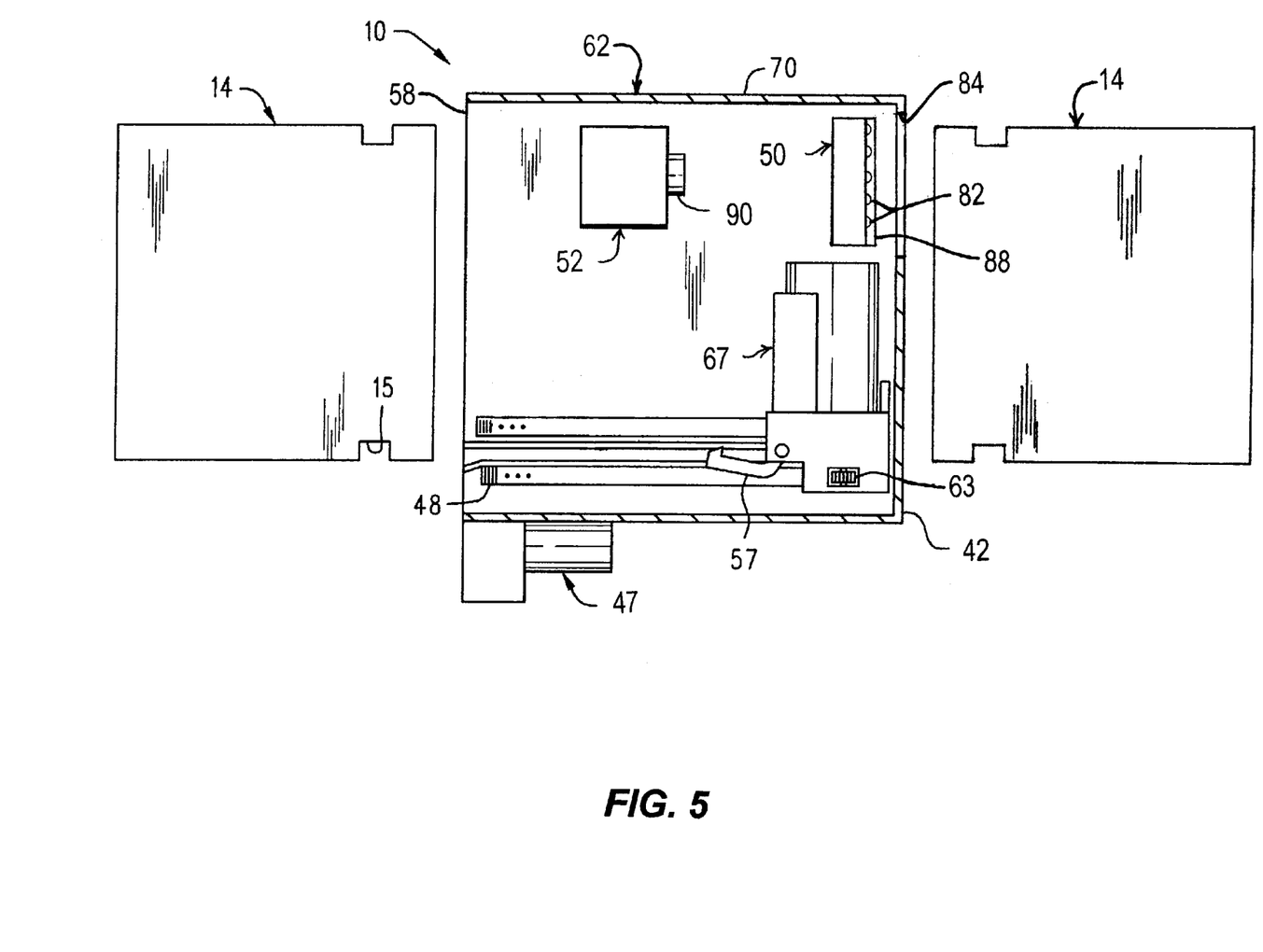
FIG. 5 is a cross-sectional view in elevation of the cartridge engaging apparatus showing the internal arrangement of the rear-facing bar code reader.

The rear-facing bar code reader or information reader 10 may be mounted to the cartridge engaging assembly 36 so that it can read machine readable indicia (e.g., read bar code labels 34) provided on the cartridges 14 positioned opposite the back side 42 of the cartridge engaging assembly 36. The machine readable indicia may be representative of cartridge identification information that is unique to each cartridge. With reference now to FIGS. 3 and 5, the bar code reader 10 may comprise an illumination system 50 and a detector system 52. The illumination system 50 illuminates the bar code label 34 so that the machine readable indicia (e.g., bar codes 86) contained thereon can be detected by the detector system 52. The detector system 52 produces an output signal (not shown) indicative of the information or data encoded on the bar code label 34. That information or data may be used by a control system (not shown) associated with the data storage system 12, to identify or inventory the various data cartridges 14.

As will be described in greater detail below, it is generally preferred, but not required, to provide the cartridge engaging assembly 36 with a forward-facing bar code reader (not shown) to allow the cartridge engaging assembly 36 to read the bar codes 34 provided on cartridges 14 that are positioned adjacent the cartridge access side 58 of the cartridge handling system 36. Providing the cartridge engaging assembly 36 with both a rear-facing bar code reader 10 and a forward-facing bar code reader (not shown) allows the data storage system to read the bar code labels 34 provided on the cartridges 14 that are arranged along both the first and third cartridge access sides 20 and 24 without moving the cartridge engaging assembly 36 along both cartridge access sides 20 and 24.

The rear-facing bar code reader 10 according to one embodiment of the present invention may be used as follows. Once the various data cartridges 14 have been provided with bar code labels 34 that uniquely identify each data cartridge 14 and once the cartridges 14 have been loaded into the data storage system 12, the rear-facing bar code reader 10 may be used to read the bar codes provided thereon to identify each cartridge during a cartridge inventory operation. More specifically, the cartridge engaging assembly 36 is operated so that as it moves along one of the cartridge access sides (e.g., cartridge access side 20) of the cartridge handling assembly 13, the bar code reader 10 reads the bar code labels 34 positioned on the cartridges contained in the cartridge storage magazines 16 located adjacent the third cartridge access side 24. If the cartridge engaging assembly 36 is provided with a forward-facing bar code reader (not shown), the data cartridges 14 that are adjacent the first cartridge access side 20 may be identified at the same time, thereby substantially decreasing the time required to identify all of the data cartridges 14 contained in the data storage system 12.

Alternatively, if the cartridge engaging assembly 36 is not provided with a forward-facing bar code reader, the data cartridges 14 that are adjacent the first cartridge access side 20 may be identified by moving the cartridge engaging assembly 36 to that portion of the U-shaped displacement path located along the third cartridge access side 26 (e.g., as indicated by position 38"). The data cartridges 14 positioned along the first cartridge access side 20 now will be adjacent the back side 42 of the cartridge handling system 36, thereby allowing the bar code reader 10 to read the bar code labels 34 positioned on those data cartridges. Once all of the data cartridges 14 have been inventoried in this manner, the data storage system 12 may then be placed in regular operation.

A significant advantage of the rear-facing bar code reader 10 according to the present invention is that it provides a means for conveniently identifying data cartridges 14 contained within the data storage system 12 without having to position the cartridge engaging assembly 36 so that its cartridge access end 58 is adjacent the data cartridge 14 that is to be identified. Consequently, the cartridge engaging assembly 36 may identify a data cartridge 14 located adjacent its back side 42 while at the same time accessing (i.e., withdrawing) a data cartridge 14 positioned adjacent the cartridge access side 58 of the cartridge engaging assembly 36. The ability to simultaneously identify a data cartridge 14 while accessing another data cartridge 14 improves the efficiency of the cartridge identification (i.e., inventory) process.

Another advantage is that the rear-facing bar code reader 10 may be used to identify the data cartridges 14 even if a data cartridge 14 is already contained in cartridge engaging system 36. That is, in many instances, the forward-facing bar code reader (not shown) provided on the cartridge engaging assembly 36 cannot be used when a data cartridge 14 is contained within the cartridge engaging assembly 36. Therefore, the present invention allows data cartridges to be identified and/or inventoried even though the cartridge engaging assembly 36 may be transporting a data cartridge 14.

Still yet other advantages are associated with the present invention. For example, if the cartridge engaging assembly 36 is provided with a forward-facing bar code reader (not shown) as well as the rear-facing bar code reader 10 of the present invention, the cartridge engaging assembly 36 will be capable of rapidly identifying the data cartridges 14 contained within the data storage system 12. That is, the cartridge engaging assembly 36 will be capable of substantially simultaneously identifying two data cartridges 14; one data cartridge 14 positioned adjacent the back side 42 of cartridge engaging assembly 36 and one data cartridge 14 positioned adjacent the cartridge access side 58 of cartridge engaging assembly 36.

Having briefly described the rear-facing bar code reader 10 according to one embodiment of the invention, as well as some of its more significant features and advantages, the various embodiments of the rear-facing bar code reader 10 will now be described in detail. However, before proceeding with the description, it should be noted that the rear-facing bar code reader 10 according to the present invention may be utilized in any of a wide range of data storage systems now known in the art or that may be developed in the future for storing and accessing one or more data cartridges. Accordingly, the present invention should not be regarded as limited to the particular data storage system 12 shown and described herein. It should also be noted that while the rear-facing bar code reader 10 is shown and described herein as it could be used to identify a bar code label 34 positioned on a DLT (digital linear tape) data cartridge 14 having a standard size and configuration, it is not limited to any particular type or style of machine readable (i.e., bar code) label or any particular type or style of data cartridge. Indeed, the rear-facing bar code reader 10 according to the presnet invention could be used with any type of machine readable code and/or data storage device comprising any type of data storage medium (e.g., magnetic disk or tape, optical disk, etc.). Consequently, the present invention should not be regarded as limited to use with the particular bar code label 34 data cartridge 14, data storage system 12 shown and described herein.

With the foregoing considerations in mind, one embodiment of a rear-facing bar code reader or information reader 10 is shown in FIG. 1 as it may be used in a data storage or "autochanger" system 12 containing a plurality of data cartridges 14. The autochanger system 12 may be provided with a cartridge handing system 13 containing a cartridge engaging assembly 36 that is suitable for transferring the data cartridges 14 between one or more cartridge receiving devices, such as one or more cartridge storage magazines 16 and one or more cartridge read/write devices 18. The various cartridge receiving devices (e.g., the cartridge storage magazines 16 and the cartridge read/write devices 18) may be positioned at various locations within the data storage system 12 so that they define a generally U-shaped configuration (FIG. 1), although other arrangements are possible. By way of example, the data storage system 12 may comprise a data storage system of the type shown and described in U.S. Pat. No. 6,025,972 entitled "Multi-Plane Translating Cartridge Handling System" of Schmidtke, et al., which is incorporated herein by reference for all that it discloses. Alternatively, the rear-facing bar code reader 10 may be utilized in other types of data storage systems now known in the art or that may be developed in the future.

The cartridge handling system 13 is best seen in FIGS. 1 and 2 and may comprise a generally rectangularly shaped structure 26 comprising a lower plate 28 and an upper plate 30 that are held in substantially parallel, spaced-apart relation by a support structure 72. The rectangularly shaped structure 26 defines the first cartridge access side 20, the second cartridge access side 22, and the third cartridge access side 24. The first and third cartridge access sides 20 and 24 are positioned in generally spaced-apart relation on opposite sides of the rectangularly shaped structure 26, whereas the second cartridge access side 22 is oriented generally transversely to the first and third cartridge access sides 20 and 24. The various cartridge receiving devices 16 and 18 are positioned around the cartridge handling system 13 so that respective cartridge access planes 41, 43, and 45 defined by the cartridge receiving devices 16 and 18 are located adjacent the three cartridge access sides 20, 22, and 24. See FIG. 1.

The lower plate 28 of frame assembly 26 may be provided with a lower U-shaped guide member or track 32 that forms a substantially continuous member along the first, second, and third cartridge access sides 20, 22, and 24 of the frame assembly 26. Similarly, the upper plate 30 may be provided with an upper U-shaped guide member or channel (not shown) that also forms a substantially continuous member along the first, second, and third cartridge access sides 20, 22, and 24 of the frame assembly 26. The cartridge engaging assembly 36 is configured to engage the guide members (e.g., guide member or track 32) provided on the lower and upper plates 28 and 30. The cartridge engaging assembly 36 may be moved along the guide members by an actuator system 46. For example, the actuator system 46 may move the cartridge engaging assembly 36 between a first position 38 adjacent the first cartridge access side 20, a second position 38' adjacent the second cartridge access side 22, and a third position 38" adjacent the third cartridge access side 24. That is, the cartridge engaging assembly 36 moves along a generally U-shaped displacement path 40.

The actuator system 46 may comprise any of a wide range of systems suitable for moving the cartridge engaging assembly along the guide members. By way of example, in the embodiment shown and described herein, the actuator system 46 comprises a rack and pinion drive system having a U-shaped gear rack 44 mounted adjacent the U-shaped guide member or track 32 in the lower plate 28. A lower pinion gear 60 is mounted to the cartridge engaging assembly 36 so that it engages the U-shaped gear rack 44. A pair of lower bearing members 51 and 53 mounted to the cartridge engaging assembly 36 are configured to be received by the U-shaped guide member or track 32. The cartridge engaging assembly 36 may also be provided with a pair of upper bearing members 55, 59, and an upper pinion gear 61 (FIG. 3) which engage the upper U-shaped guide member (not shown) and an upper U-shaped guide rack (also not shown) provided on the upper plate 30 of the cartridge handing system 13. A drive pinion actuator system 47 (FIG. 5) is used to drive the lower and upper pinion gears 60 and 61 to move the cartridge engaging assembly 36 along the U-shaped displacement path 40.

The foregoing description of the data storage system 12 and cartridge handling system 13 is provided in order to better understand one environment in which the rear-facing bar code reader 10 according to the present invention may be used. However, it should be understood that the rear-facing bar code reader 10 may be used in any of a wide range of other types of data storage systems and in conjunction with any of a wide range of cartridge handling systems now known or that may be developed in the future. Consequently, the present invention should not be regarded as limited to the particular data storage system 12 and cartridge handling system 13 shown and described herein. Also, since detailed descriptions of the data storage system 12 and cartridge handling system 13 are not required to understand or practice the rear-facing bar code reader 10 according to the present invention, the particular data storage system 12 and cartridge handling system 13 that may be used in conjunction with the rear-facing bar code reader 10 will not be described in further detail herein.

The cartridge engaging assembly 36 that is used to engage and carry the data cartridges 14 is best seen in FIGS. 2, 3, and 5 may include a frame assembly 62 having a first side member 70 and a second side member 71. The two side members 70 and 71 of frame assembly 62 define a chamber or cavity 65 of sufficient size to receive the data cartridge 14. The cartridge engaging assembly 36 may be provided with a cartridge plunge mechanism or "thumb" assembly 67 that is slidably mounted to the frame assembly 62 so that the thumb assembly 67 may be moved toward and away from the cartridge access end 58 of frame assembly 62. The thumb assembly 67 may be provided with a latch or "finger" 57 that is sized to engage a suitable feature, e.g., a notch 15, provided on the data cartridge 14. The finger 57 allows the thumb assembly 67 to engage and withdraw the data cartridge 14 from the cartridge receiving device, e.g., a cartridge magazine 16 or a cartridge read/write device 18, as the case may be.

The thumb assembly 67 may be moved back and forth within the cartridge engaging assembly 36 by a rack and pinion drive assembly. The rack and pinion drive assembly may comprise a gear rack 48 that is affixed to the first side member 70 of the cartridge engaging assembly 36. A pinion gear 63 provided on the thumb assembly 67 engages the gear rack 48, thereby allowing the thumb assembly 67 to be moved back and forth within the cartridge engaging assembly 36.

The rear-facing bar code reader 10 may be mounted to the first side member 70 of the cartridge engaging assembly 36 so that it can detect a machine readable code that is provided on a data cartridge 14 located adjacent the back side 42 of the cartridge engaging assembly 36. See FIGS. 3 and 5. The machine readable code may be representative of information or data relating to the identity of the data cartridge. The machine readable code may comprise a bar code label 34 having machine readable indicia (e.g., bars 86) provided thereon. See FIG. 4. Alternatively, other types of machine readable codes may be utilized, as would be obvious to persons having ordinary skill in the art after having become familiar with the teachings of the present invention. Consequently, the present invention should not be regarded as limited to use with bar code labels.

With reference now to FIGS. 3 and 5, the bar code reader 10 utilized in one preferred embodiment of the present invention may comprise an illumination system 50 and a detector system 52. The illumination system 50 may comprise any of a wide range of illumination systems that are well-known in the art or that may be developed in the future that are suitable for illuminating the machine readable indicia (e.g., the bar code label 34) provided on the data cartridge 14. Consequently, the present invention should not be regarded as limited to any particular type or style of illumination system. By way of example, in one preferred embodiment, the illumination system 50 may comprise an array of light emitting diodes 82 positioned on the first side wall 70 of the cartridge engaging assembly 36 so that they will illuminate the bar code label 34. An aperture 84 provided on the back side 42 of the cartridge engaging assembly 36 allows the light produced by the illumination system 50 to reach the bar code label 34. The illumination system 50 may be provided with a cylindrical lens 88 positioned between the LEDs 82 and the bar code label 34 to assist in focusing the light on the bar code label 34.

The detector system 52 may comprise any of a wide range of detector systems well-known in the art or that may be developed in the future that are suitable for detecting the machine readable code (e.g., the bar code labels 34) provided on the data cartridges 14. By way of example, in one preferred embodiment the detector 52 may comprise a linear array of charged-coupled devices (CCDs) (not shown) and a lens assembly 90 for focusing image light (not shown) from the bar code label 34 onto the linear CCD array (not shown). The linear CCD array produces an output signal (not shown) that is indicative of the machine-readable indicia (e.g., bar codes 84) provided on the data cartridge 14. A control system (not shown) operatively associated with the CCD array is responsive to the output signal and decodes the machine readable indicia to allow the data cartridge to be properly identified and/or inventoried. However, since such control systems for receiving the output signal produced by the detector system 50 are well-known in the art and could be readily provided by persons having ordinary skill in the art after having become familiar with the teachings of the present invention, the particular control system that may be utilized in one preferred embodiment of the present invention will not be described in further detail herein.

As was briefly mentioned above, it is generally preferred, but not required, to provide the cartridge engaging assembly 36 with a forward-facing bar code reader (not shown) to allow the cartridge engaging assembly 36 to read the bar codes 34 provided on cartridges 14 that are positioned adjacent the cartridge access side 58 of the cartridge handling system 36. The forward-facing bar code reader (not shown) may be similar to the rear-facing bar code reader just described and may comprise an illumination system (not shown) and a detector system (also not shown) mounted to the cartridge engaging assembly 36 so that the forward-facing bar code reader can detect bar codes provided on data cartridges that are located opposite the cartridge access end 58 of the cartridge engaging assembly 36. By way of example, in one embodiment, the illumination system and detector comprising such a forward-facing bar code reader may be mounted to the second opposed side 71 of the cartridge engaging assembly 36 in a manner similar to that of the rear-facing bar code reader. Consequently, the forward-facing bar code reader that is utilized in one embodiment of the present invention will not be described in further detail herein.

The rear-facing bar code reader 10 according to one embodiment of the present invention may be used as follows to identify and/or inventory the various data cartridges 14 contained in the data storage system 12. Consider, for example, a situation wherein the various data cartridges 14 have been provided with bar code labels 34 that uniquely identify each data cartridge 14. Assume also that the data cartridges 14 have been loaded into the data storage system 12. At this time, the rear-facing bar code reader 10 may be used to read the bar codes provided on each cartridge 14 to identify and/or inventory each data cartridge 14. Specifically, the cartridge engaging assembly 36 is operated so that as it moves along one of the cartridge access sides (e.g., cartridge access side 20) of the cartridge handling assembly 13, the bar code reader 10 reads the bar code labels 34 positioned on the cartridges 14 contained in the cartridge storage magazines 16 that are located adjacent the third cartridge access side 24. If the cartridge engaging assembly 36 is provided with a forward-facing bar code reader (not shown), the data cartridges 14 that are adjacent the first cartridge access side 20 may be identified at the same time, thereby substantially decreasing the time required to identify all of the data cartridges 14 contained in the data storage system 12.

Alternatively, if the cartridge engaging assembly 36 is not provided with a forward-facing bar code reader, the data cartridges 14 that are adjacent the first cartridge access side 20 may be identified by moving the cartridge engaging assembly 36 to that portion of the U-shaped displacement path that is located along the third cartridge access side 26 (e.g., as indicated by position 38"). The data cartridges 14 that are positioned along the first cartridge access side 20 now will be adjacent the back side 42 of the cartridge handling system 36, thereby allowing the rear-facing bar code reader 10 to read the bar code labels 34 positioned on those data cartridges 14. Once all of the data cartridges 14 have been inventoried in this manner, the data storage system 12 may then be placed in regular operation.

It is contemplated that the inventive concepts herein described may be variously otherwise embodied and it is intended that the appended claims be construed to include alternative embodiments of the invention except insofar as limited by the prior art.

What is claimed is:

1. A data storage system, comprising:
    a plurality of cartridge receiving devices provided within said data storage system;
    a cartridge engaging apparatus having a cartridge access side and a back side, said cartridge engaging apparatus being mounted within said data storage system so that said cartridge engaging apparatus moves along a displacement path, the arrangement of said plurality of cartridge receiving devices and the displacement path being such that at least one of said plurality of cartridge receiving devices is located opposite the back side of said cartridge engaging apparatus; and
    an information reader mounted to said cartridge engaging apparatus, said information reader reading cartridge information provided on a data cartridge located adjacent the back side of said cartridge engaging apparatus when the cartridge access side of said cartridge engaging apparatus is facing an opposite direction of said information reader.

2. The data storage system of claim 1, wherein the cartridge information comprises visually discernable indicia.

3. The data storage system of claim 2, wherein said information reader comprises:
    an illumination system, said illumination system illuminating the visually discernable indicia;
    a detector, said detector detecting the visually discernable indicia and producing an output signal relating thereto; and
    a data processing system operatively associated with said detector, said data processing system being responsive to the output signal and producing machine readable data representative of the visually discernable indicia.

4. The data storage system of claim 3, wherein the visually discernable indicia comprise bar codes.

5. The data storage system of claim 3, wherein said illumination system comprises a light emitting diode.

6. The data storage system of claim 3, wherein said detector comprises a line sensor array.

7. The data storage system of claim 6, wherein said line sensor array comprises a linear array of charged-coupled devices.

8. The data storage system of claim 1, further comprising a second information reader mounted to said cartridge engaging apparatus, said second information reader reading cartridge information provided on a data cartridge located adjacent the cartridge access side of said cartridge engaging apparatus.

9. The data storage system of claim 8, wherein the cartridge information comprises visually discernable indicia.

10. The data storage system of claim 9, wherein said second information reader comprises:
- an illumination system, said illumination system illuminating the visually discernable indicia;
- a detector, said detector detecting the visually discernable indicia and producing an output signal relating thereto; and
- a data processing system operatively associated with said detector, said data processing system being responsive to the output signal and producing machine readable data representative of the visually discernable indicia.

11. The data storage system of claim 1, wherein said displacement path comprises a U-shaped path having first and second opposed leg sections and a connecting section joining together the first and second opposed leg sections.

12. The data storage system of claim 11, wherein said plurality of cartridge receiving devices comprise:
- a first cartridge storage location positioned adjacent the first opposed leg section of said U-shaped path;
- a second cartridge storage location positioned adjacent the second opposed leg section of said U-shaped path; and
- a cartridge read/write device positioned adjacent the connecting section of said U-shaped path.

13. A data storage system, comprising:
- means for defining at least one cartridge storage location within said data storage system;
- means for defining a displacement path within said data storage system;
- cartridge engaging means having a cartridge access side and a back side operatively associated with said displacement path for engaging and transferring a data cartridge along the displacement path, the arrangement being such that said at least one cartridge storage location is located opposite the back side of said cartridge engaging means; and
- means, mounted to said cartridge engaging means, for reading cartridge information provided on the data cartridge located adjacent the back side of said cartridge engaging means when the cartridge access side of said cartridge engaging means is facing an opposite direction of said means for reading cartridge information.

14. The data storage system of claim 13, wherein the cartridge information comprises visually discernable indicia and wherein said means for reading comprises:
- illumination means for illuminating the visually discernable indicia;
- detector means for detecting the visually discernable indicia and for producing an output signal relating thereto; and
- data processing means operatively associated with said detector means for converting the output signal into machine readable data representative of the visually discernable indicia.

15. The data storage system of claim 13, further comprising second means mounted to said cartridge engaging means for reading cartridge information provided on the data cartridge located adjacent the cartridge access side of said cartridge engaging means.

16. A data storage system, comprising:
- a chassis;
- a plurality of cartridge receiving devices mounted to said chassis;
- a guide member mounted to said chassis, said guide member defining a displacement path;
- a cartridge engaging apparatus having a cartridge access side and a back side, said cartridge engaging apparatus being mounted to said guide member so that said cartridge engaging apparatus moves along the displacement path, the arrangement of said plurality of cartridge receiving devices and the displacement path being such that at least one of said plurality of cartridge receiving devices is located opposite the back side of said cartridge engaging apparatus; and
- an information reader mounted to said cartridge engaging apparatus, said information reader reading cartridge information provided on a data cartridge located adjacent the back side of said cartridge engaging apparatus when the cartridge access side of said cartridge engaging apparatus is facing an opposite direction of said information reader.

17. The data storage system of claim 16, wherein said guide member comprises a generally U-shaped guide track having first and second opposed leg sections and a connecting section joining together the first and second leg sections.

18. The data storage system of claim 17, wherein said plurality of cartridge receiving devices comprise:
- a first cartridge storage location positioned adjacent the first opposed leg section of said U-shaped guide track;
- a second cartridge storage location positioned adjacent the second opposed leg section of said U-shaped guide track; and
- a cartridge read/write device positioned adjacent the connecting section of said U-shaped guide track.

19. A method for detecting cartridge information provided on a data cartridge stored within a data storage system, comprising:
- providing the data storage system with a cartridge engaging apparatus having a cartridge access side and a back side, the cartridge engaging apparatus being mounted within the data storage system so that the cartridge engaging apparatus moves along a displacement path, the arrangement being such that at least one data cartridge is located opposite the back side of the cartridge engaging apparatus;

providing an information reader to the cartridge engaging apparatus so that the information reader can read cartridge information provided on a data cartridge located adjacent the back side of the cartridge engaging apparatus when the cartridge access side of said cartridge engaging apparatus is facing an opposite direction of said information reader;

moving the cartridge engaging apparatus so that the back side is adjacent a data cartridge; and operating the information reader to read the cartridge information provided on the data cartridge.

20. The method of claim 19, further comprising:

moving the cartridge engaging apparatus so that the back side is adjacent a second data cartridge; and operating the information reader to read the cartridge information provided on the second data cartridge.

* * * * *